Oct. 22, 1963 C. W. CLINE 3,107,551
VIBRATION DAMPER
Filed Sept. 11, 1962
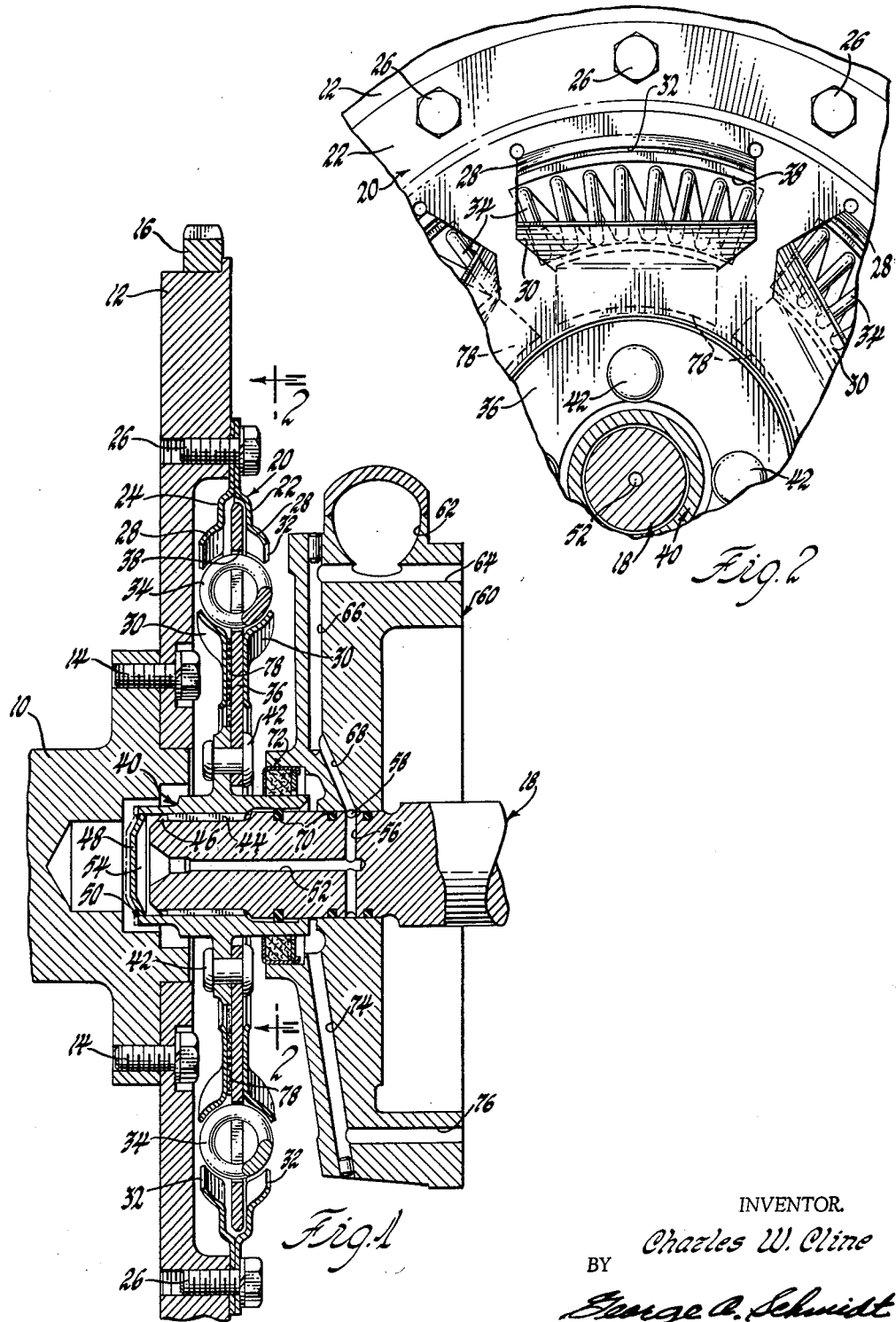
INVENTOR.
Charles W. Cline
BY
George A. Schmidt
ATTORNEY

United States Patent Office 3,107,551
Patented Oct. 22, 1963

3,107,551
VIBRATION DAMPER
Charles W. Cline, Livonia, Mich., assignor to General Motors Corporation, Detroit, Mich., a corporation of Delaware
Filed Sept. 11, 1962, Ser. No. 222,790
3 Claims. (Cl. 74—574)

This invention relates to vibration dampers, and more particularly to a vibration damper having friction drag provision applied therein to eliminate certain vibration disturbances.

In many motor vehicles, and particularly in motor vehicles provided with automatic transmissions, vibration dampers are disposed between the crankshaft driven flywheel and the transmission input shaft. It is often found that severe vibrations emanate from the vibration damper system, causing objectionable noise. These vibrations have been found to be caused by torsional resonance of a torsional pendulum type involving the usual damper springs and the various parts of the automatic transmission. These vibrations are normally found during idle, first or reverse gear operation of the engine, but not in second or third gear operations where the drive is mechanical.

It is proposed to eliminate the vibration problems caused by the torsional resonance in idle, reverse and first gear operations by providing a friction drag torque in the vibration damper. The device in which this invention is embodied comprises a vibration damper having a friction material disposed between the driving and driven plates in order to apply a certain amount of drag torque therebetween. Friction in the vibration damper in idle, first and reverse gear operation is not detrimental to smooth operation of the drive line since all the torque passes through portions of the automatic transmission, such as the fluid coupling. It is desirable to eliminate the added friction during second and third gear operations where the drive is all or mostly mechanical since greater torque disturbances would result. To accomplish this purpose it is proposed to provide friction damping subject to hydraulic fluid pressure during only the idle, first and reverse gear operations.

The resulting structure is a vibration damper which effectively eliminates the major vibration disturbances and also eliminates the ancillary vibration disturbances normally found in the idle, first and reverse gear operations.

These and other advantages will become more apparent from the following description and drawing, in which:

FIGURE 1 is a cross-sectional view of a portion of the vehicle drive line illustrating the vibration damper and the position of the various parts; and FIGURE 2 is an elevational view of a portion of the vibration damper illustrated in FIGURE 1, taken substantially along the line 2—2 of FIGURE 1 and looking in the direction of the arrows.

Referring more particularly to the drawing, FIGURE 1 best illustrates the position of the various parts of the vibration damper. A typical engine crankshaft 10 has secured thereto a conventional flywheel 12. The method of attachment may be by means of a series of bolts 14 threadedly received in the crankshaft, as illustrated. The usual starter ring gear 16 is suitably secured to the outer rim of the flywheel 12. Crankshaft 10 and flywheel 12 are provided to rotate a transmission shaft, illustrated generally by the numeral 18, through a vibration damper assembly, illustrated generally by the numeral 20.

Vibration damper 20 includes a pair of sheet metal annular plate members 22 and 24 which are adjacently disposed and which are secured to the flywheel 12 in any suitable manner, such as by bolts 26. Plates 22 and 24 are provided with a series of upper embossments 28 and lower embossments 30 defining chambers having slots 32 formed therein. Each of the chambers formed by the embossments 28 and 30 contains a damper spring 34. A driven plate 36 extends between the plates 22 and 24 and into the chambers defined by embossments 28 and 30, and is provided with a series of openings 38 also receiving the damper springs 34. Thus, the drive connection between the driven plate members 22 and 24 and the driven plate 36 is through the damper springs 34.

Driven plate 36 terminates inwardly in a hub, illustrated generally by the numeral 40. Driven plate 36 may be secured to hub 40 in any suitable manner, as by a plurality of rivets 42. Hub 40 is provided with an internal spline 44 which is received in a mating external spline 46 formed on the end of the transmission shaft 18. Splines 44—46 transmit the drive from the driven plate 36 to the transmission shaft 18.

Hub 40 is provided with a closed end which may be formed by a suitable plug 48 welded to the hub as at 50. Although this is the preferred form, the hub may just as well be formed originally with a closed end.

Transmission shaft 18 is provided with an axial passage 52 which opens into a chamber 54 formed between the end of the transmission shaft 18 and the plug 48. Axial passage 52 is intersected by a transverse passage 56 extending completely through the transmission shaft 18 and communicating with an annular groove 58 formed therein. The purpose for these passages will become hereinafter more apparent.

Adjacent the vibration damper 20 and flywheel 12 is a housing, illustrated generally by the numeral 60. Housing 60 has a large passage 62 therein which communicates with a longitudinal passage 64. Passage 64 intersects a second passage 66 which in turn communicates with annular groove 58 through a third passage 68. Thus, a fluid circuit is established between large passage 62 and the chamber 54 through the passages 64, 66, 68, 58, 56 and 52.

Large passage 62 is provided to carry a fluid under pressure which is dependent upon the gear operation of the vehicle. In other words, during the idle, first or reverse gear operation of the engine a fluid under pressure exists in large passage 62 and is conveyed through the hydraulic circuit to the chamber 54. The fluid is not under pressure during second or third gear operation. The source of fluid may be of any suitable nature, for example, the line boost pressure generally available at the front pump of the transmission.

In order to prevent the leakage of fluid from the annular groove 58 and from the splines 44—46 a series of O-ring seals 70 may be provided. Any other suitable sealing means may be substituted for O-rings 70. A seal assembly 72 is also provided between the hub 40 and the housing 60 in order to prevent the leakage of fluid therepast. In order to return any fluid from the chamber 54 that may leak past seals 70, and to prevent pressurizing seal 72, a passage 74 and intersecting passage 76 may be provided in the housing 60 returning the fluid to a suitable reservoir.

Disposed between the drive plate 24 and the driven plate 36 is a series of friction members 78. Friction plate 36 is a series of friction members 78. Friction members 78 may take the form of a single annular ring or may take the form of a plurality of pads, as illustrated in FIGURE 2, disposed circumferentially around the hub 40. The friction members 78 may be bonded to either the driving plate 24 or the driven plate 36 and are of sufficient frictional properties to provide a suitable drag torque in the vibration damper to eliminate the torsional pendulum type resonance that is found in idle, first or reverse gear operations.

When operating the engine and transmission in idle, first or reverse gear, the fluid pressure in the large passage 62 builds up to a predetermined amount and causes fluid under pressure to flow through the hydraulic circuit including passages 64, 66, 68, 56 and 52 to the chamber 54. The build-up of pressure in chamber 54 causes the hub 40 to move to the left, as viewed in FIGURE 1, engaging the friction member 78 securely between the driving plate 24 and the driven plate 36. This engagement provides the necessary friction drag torque in the vibration damper to damp out the torsional resonance. As the transmission shifts to second or third gear operation, the fluid pressure in the large passage 62 drops off and the hub 40 moves back to its original position, that is, to the right as viewed in FIGURE 1, by the action of the damper springs 34 operating against the driving and driven plates, and the friction is thus removed from the system and the normal mechanical drive is re-established.

Thus, a vibration damper is provided which is free of torsional resonance caused by the absolute lack of friction in the lower gear ranges of operation. The friction material may be easily disposed between the driving and driven plate members and is effective to eliminate the objectionable vibrations.

What is claimed is:

1. A vibration damper for an engine having a flywheel and a shaft and comprising:
   a driving plate secured to said flywheel;
   a driven plate secured to said shaft;
   a spring means disposed between said driving plate and said driven plate for driving said driven plate and for damping firing impulses imparted to said flywheel and said driving plate by said engine;
   friction means disposed between said driving plate and said driven plate for resisting relative rotation between said driving plate and said driven plate;
   and fluid pressure means for actuating said friction means during certain conditions of operation of the transmission driven by said shaft.

2. A vibration damper for an engine having a flywheel and a shaft and comprising:
   a driving plate secured to said flywheel and rotatable therewith;
   a driven plate secured to said shaft and rotatable therewith;
   a plurality of springs disposed in impulse absorbing relation between said driving plate and said driven plate and rotating said driven plate with said driving plate;
   friction means secured to one of said plates and operable to engage the other of said plates to resist relative rotation therebetween and damp vibrations therebetween;
   and fluid pressure means operable to engage said friction means and the other of said plates during portions of the range of operation of the transmission driven by said shaft.

3. A vibration damper for an internal combustion engine having a flywheel and comprising:
   a driving plate secured to said flywheel and rotatable therewith;
   a driven plate adjacent said driving plate and terminating in an internally splined hub;
   a plurality of damper springs spaced about said driving plate and engaging said driving plate and said driven plate for rotating said driven plate with said driving plate and isolating vibrations from said driven plate;
   an externally splined shaft slidably received in said hub and rotatable therewith and forming a chamber with said hub, said shaft having fluid passage means therethrough communicating with said chamber;
   a friction plate disposed between said driving plate and said driven plate for resisting relative rotation therebetween for damping vibrations in said vibration damper;
   and fluid pressure means operable through said fluid passage means and said chamber to engage said driving plate and said friction plate and said driven plate during portions of the operating range of the transmission driven by said shaft.

References Cited in the file of this patent

UNITED STATES PATENTS

| | | |
|---|---|---|
| 2,042,570 | Wemp | June 2, 1936 |
| 2,364,988 | McFarland | Dec. 12, 1944 |
| 2,623,409 | Herndon et al. | Dec. 30, 1952 |